(12) United States Patent
Yoneda et al.

(10) Patent No.: US 7,091,645 B2
(45) Date of Patent: Aug. 15, 2006

(54) CONCENTRATED-WINDING TYPE STATOR COIL UNIT FOR ROTARY ELECTRIC MACHINE

(75) Inventors: Shigenori Yoneda, Oobu (JP); Masahiro Seguchi, Oobu (JP); Noriyasu Inomata, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/764,512

(22) Filed: Jan. 27, 2004

(65) Prior Publication Data

US 2004/0256941 A1 Dec. 23, 2004

(30) Foreign Application Priority Data

Jan. 27, 2003 (JP) ............................... 2003-017230

(51) Int. Cl.
*H02K 17/00* (2006.01)
(52) U.S. Cl. .......................... 310/208; 310/71; 29/605
(58) Field of Classification Search ................ 310/208, 310/203, 71, 260; 29/605; 242/432, 432.5; 335/213, 282, 299; 336/189, 190, 208, 221–225
See application file for complete search history.

(56) References Cited

U.S. PATENT DOCUMENTS

| | | | | |
|---|---|---|---|---|
| 2,930,014 | A * | 3/1960 | Van Der Hoek et al. | 336/190 |
| 3,851,830 | A * | 12/1974 | Barthalon | 336/208 |
| 4,314,173 | A * | 2/1982 | Srdoch | 310/260 |
| 4,794,361 | A * | 12/1988 | Young | 336/189 |
| 5,963,120 | A * | 10/1999 | Zaviska | 336/208 |
| 5,986,377 | A * | 11/1999 | Yamada et al. | 310/216 |
| 6,011,339 | A * | 1/2000 | Kawakami | 310/208 |
| 6,127,760 | A | 10/2000 | Nagasaki et al. | |
| 6,255,756 | B1 * | 7/2001 | Richter | 310/208 |
| 6,600,244 | B1 * | 7/2003 | Okazaki et al. | 310/71 |
| 6,674,195 | B1 * | 1/2004 | Yagyu et al. | 310/71 |
| 6,798,111 | B1 * | 9/2004 | Petersen | 310/254 |

FOREIGN PATENT DOCUMENTS

| | | | |
|---|---|---|---|
| DE | 3433003 A1 * | 9/1984 | |
| JP | A-7-075270 | 3/1995 | |
| JP | A 2000-197294 | 7/2000 | |
| JP | A 2000-245092 | 9/2000 | |
| JP | A 2001-25198 | 1/2001 | |
| JP | A 2001-178051 | 6/2001 | |
| JP | A 2001-186703 | 7/2001 | |
| JP | A-2002-034212 | 1/2002 | |
| JP | A 2002-112484 | 4/2002 | |
| JP | A 2002-291186 | 10/2002 | |

* cited by examiner

*Primary Examiner*—Dang Le
(74) *Attorney, Agent, or Firm*—Oliff & Berridge PLC

(57) ABSTRACT

A concentrated-winding type stator coil unit for a rotary electric machine is provided with a stator core having a core back and teeth protruding from the core back. Plural coils are wound around the teeth respectively. Each coil is composed of, for example, a first layered coil formed by winding a coil wire in a layer around each tooth to form plural turns arranged in parallel on each tooth and a second layered coil formed by winding the coil wire in a layer to from plural turns around the first layered coil wound around each tooth. The last turn of the first layered coil continues to the first turn of the second layered coil. Both ends of the coil wire are located at and on a base potion of each of the teeth as a winding-start end and a winding-finish end of each of the coils.

18 Claims, 10 Drawing Sheets

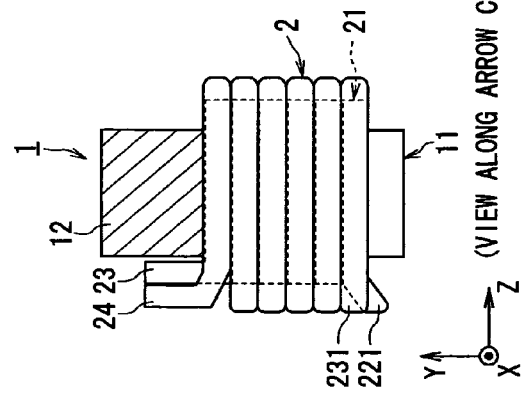
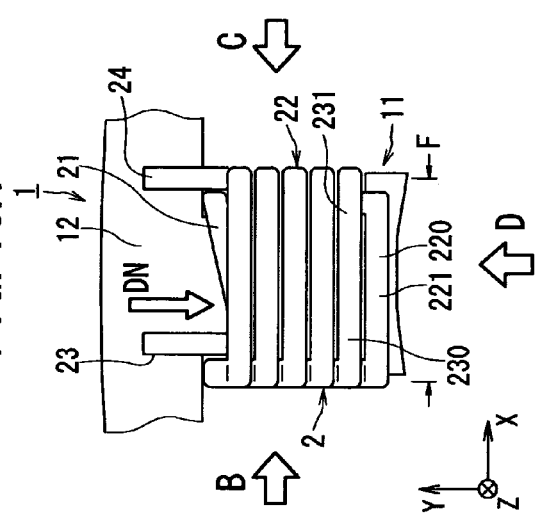
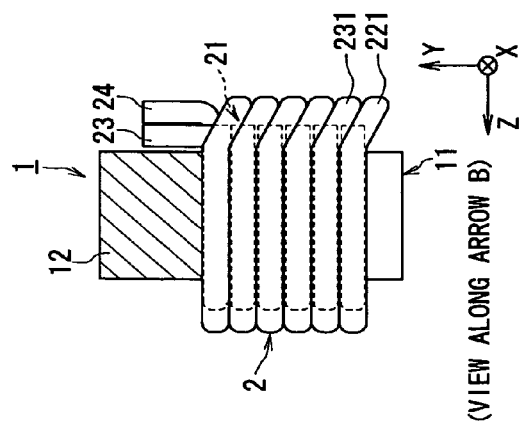

CONCENTRATED-WINDING TYPE STATOR COIL UNIT FOR ROTARY ELECTRIC MACHINE

BACKGROUND OF THE INVENTION

1. Technical Field

The present invention relates to a stator coil unit for rotary electric machines such as electric motors and electric generators, and in particular, to a concentrated-winding type stator coil unit for the rotary electric machines.

2. Related Art

In a rotary electric machine, a stator is required to convert electric energy into kinetic energy or vise versa. At present, there have been various types of stators.

One type of stator has coils each wound around each of teeth (serving as magnetic poles) of a stator core in a concentrated manner and the wound coils (frequently referred to as tooth coils) are, phase by phase, mutually connected with each other to form each phase coil. Such a stator is called "concentrated-winding type stator." In winding a coil around each tooth to manufacture the concentrated-winding type stator, it is general to employ an assembled type of core, in which partial cores divided teeth by teeth are assembled to form a stator core.

If the stator core is designed as an outer rotor type of stator, a cylindrical stator core can be used, in which a coil is directly wound around each of the teeth protruding from the outer circumferential surface of a cylindrical stator core. Alternatively, an inner rotor type of stator might be used, in which a coil is directly wound around each of the teeth protruding from the inner circumferential surface of a cylindrical stator core. A Japanese patent laid-open publication No. 2001-25198 (reference 1) discloses this kind of concentrated-winding type stator.

As shown by the reference 1, in the concentrated-winding type stator, the tooth coil is wound around each tooth or each bobbin loaded on each tooth by a necessary number of turns. Like the normal coil winding, the coil is wound in turn in the axial direction of each tooth. As a result, mutually neighboring two turns, which are electrically connected with each other, can be wound at the highest density if the two turns are placed without a gap along the circumferential surface along its axial direction.

Like the normal coil winding, the wound coil starts at one end of each tooth in a radial direction thereof (normally, the base portion of each tooth) and reaches the tip portion of the teeth, so that the first layer of coil (hereinafter called "the first layered coil" as well) is constituted. The coil is then wound on the first layer coil such that the coil returns from the tip portion of each tooth to the base portion thereof, thus constituting the second layer of coil (hereinafter called "the second layered coil" as well). Likewise, the coil is wound on the second layered coil to form the third layered coil, thereby providing a high-density winding manner. The first, second and third layered coils and subsequent coils are generalized as "layered coils."

A Japanese patent laid-open publication No. 2001-186703 (reference 2) discloses two winding ways: one is that the beginning end of a tooth coil is placed at the basis portion (or the tip portion) of each tooth and the dead end of the tooth coil is placed at the tip portion (or the base portion), while the other way is that both the beginning and dead ends of a tooth coil are placed at the tip portion of each tooth. In this case, the number of layered coils is two, so that the two-layered coil is formed.

However, as stated above, crossover wires are used to mutually and sequentially connect the tooth coils located at predetermined pitches in the circumferential direction of a stator, with the result that each phase coil is configured. Accordingly, in the two-layered coil type of tooth coil taught by the reference 2, it is probable that both the beginning and dead ends of the tooth coil be localized at the tip. In such a localized location of both the ends, the crossover wires are located to almost touch the surface of the rotor, if the crossover wires are bridged to be the shortest. It has been found that this bridging location has various drawbacks. For example, vibration will cause the wire to touch the rotor and the wire obstructs fitting work of the rotor into a machine.

One solution to those drawbacks is provided by a particular connection manner, in which the crossover wire is drawn from the dead end located at the tip portion of each tooth to the base portion thereof in the radial direction of a rotor (in the case of the inner rotor type, to each radial outside end), is made to extend along the rotor surface to reach the next tooth belonging to the same phase, and is made to extend along the tooth to arrive at the tip portion thereof. The crossover wire, which has been at the tip portion of the next tooth, is connected to the beginning end of a tooth coil wound around the tooth and located at the tip portion. However, this kind of connection manner will cause the crossover wire to be longer between teeth, thus leading to an increase in power loss on account of resistance across the stator coil.

In addition, the winding technique taught by the reference 2 involves a folded portion, at which the wire is folded from the first layer coil to the second layered coil so as to allow both of the last turn of the first layered coil and the first turn of the second layered coil to be stacked one on the other. At this folded portion, the wound coil becomes thicker and protrudes from the surface of a tooth in the radial direction thereof by an amount corresponding to the thickness (of diameter) of the wire. This protrusion of the wound coil will reduce a slot lamination factor. That is, to make it possible to wind one pair of tooth coils around two teeth respectively located at both ends of one slot, an excessive space should be secured to accommodate the respective folded portions therein due to the protrusions of the folded coil in the radial direction. Therefore, of a circumferential width of each slot, a space corresponding to a width which is two times the thickness of the wire becomes useless, reducing the slot lamination factor.

Although the above has been explained on condition that the tooth coils are mutually connected in series phase by phase, the foregoing difficulties are true of a stator coil unit in which the tooth coils are mutually connected in parallel phase by phase with the use of crossover bus bars.

SUMMARY OF THE INVENTION

The present invention has been made with due consideration to the foregoing difficulties, and an object of the present invention is to provide a concentrated-winding type stator coil unit capable of reducing a power loss on account of resistance across a coil wire, preventing wires of the stator from coming in contact with a rotor, preventing interference with fitting work of the rotor, and raising a winding density of turns.

In order to realize the above object, a first aspect of the present invention is provided by a concentrated-winding type stator coil unit for a rotary electric machine. The stator coil unit comprises a stator core having a core back and teeth protruding from the core back and a plurality of coils wound around the teeth respectively. Each of the coils is composed of a plurality of layered coils consisting of one or more pairs of layered coils consisting of a first layered coil formed by winding an insulation-coated coil wire in a layer around each of the teeth to form a plurality of turns arranged on each tooth and a second layered coil formed by winding the coil wire in a layer to form a plurality of turns arranged on each of the first layered coils wound around the teeth respectively. The coil wire is wound to allow a last turn of the first layered coil to continue to a first turn of the second layered coil and both ends of the coil wire are located at and on a base potion of each of the teeth so that both ends serve as a winding-start end and a winding-finish end of each of the coils.

Accordingly, in the present invention, the winding-start and -finish ends of each of the coils wound around the teeth can be located on the base side of each of the teeth (that is, a portion neighboring to the core back). This location of both the ends enables makes it possible that crossover wires connecting both coils is the shortest in length, whereby an increase in loss due to resistance across each the crossover wire is eliminated or suppressed. Concurrently, the connections made between the leading ends and the crossover wires as well as the crossover wires themselves can be arranged apart sufficiently from the circumferential surface of a rotor. Hence the problem that not only the crossover wires and/or the connections come in contact with the rotor but also the fitting-in operation of the rotor has difficulties can be solved in a sure manner. Additionally, in cases where the crossover wires are assembled to be held by the stator core, there is no worry that the coils become obstacles to the holding assembly operation. The crossover wires can be held easily.

Preferably, both the winding-start end and a winding-finish end are drawn out from both the first and second layered coils along the core back as a pair of leading ends of each of the teeth. It is also preferred that both of the winding-start end and a winding-finish end are placed separately at both ends of the base portion of each of the teeth in a circumferential direction of the stator core. By way of example, both the leading ends are drawn out directly toward the core back with the separation therebetween kept, whereby the both the leading ends are located on the same side of the core back in an axial direction of the stator core.

It is also preferred that the first layered coil is composed of plural turns including the last turn, the plural turns of the first layered coil being wound in turn along a direction from the base portion of each of the teeth to a tip portion thereof and the second layered coil is composed of plural turns including the first turn, the plural turns of the second layered coil being wound in turn along a direction from the tip portion to the base portion.

Preferably, the first turn of the second layered coil has a coil-bent portion bent toward a tip portion of each of the teeth, a second turn of the second layered coil has another coil-bent portion first bent toward the base portion of each of the teeth and then bent toward the tip portion thereof so that the second turn is juxtaposed to the first turn in a radial direction of the stator core, and one or more other remaining turns of the second layered coil, which continues in turn to the second turn, each has another coil-bent portion first bent toward the base portion of each of the teeth and then bent toward the tip portion thereof so that the remaining turns juxtaposed in sequence to the second turn in the radial direction of the stator core. In this configuration, by way of example, the coil-bent portions of the turns of the second layered coil are arranged over one side of each of the tooth in the axial direction of the stator core, the one side being the same as the side of the core back on which both the leading ends are located.

It is also preferred that the stator coil unit comprises bus bars serving as at least one of tooth-to-tooth crossover lines, a neutral-point line, and phase terminals and being disposed in proximity to an axial surface of the core back, the axial surface being the same as the side of the core back on which both the leading ends are located.

In order to realize the above object, a second aspect of the present invention is provided by a method of winding a coil wire around each of teeth protruding from a core back of a stator core incorporated in a concentrated-winding type stator coil unit for a rotary electric machine, the method comprising the steps of: locating a one end of the coil wire along a single side surface of a base portion of each of the tooth with a first predetermined end portion of the one end drawn out toward the core back as a first leading end, the single side surface facing an axial direction of the stator core; first winding the core wire on and around each of the teeth to form a plurality of turns extending as a first layered coil from the base of each tooth to a tip portion thereof, a last turn being wound to reach a position on each tooth at which the side surface begins; second winding the coil wire on and around the first layered coil wound on and around each tooth to form a plurality of turns extending as the second layered coil from the tip portion of each tooth to the base portion, the first turn of the second layered coil being continued from the last turn of the first layered coil, the second forming step including a sub-step of forming and winding a transit coil portion serving as both part of the last turn of the first layered coil and part of the first turn of a second layered coil wound around the first layered coil, the transit coil portion being bent to run a different path at least partially shifted toward the tip of each tooth; and locating a remaining end of the coil wire along the single side surface of the base portion of each of the tooth with a second predetermined end portion of the remaining end drawn out toward the core back as a second leading end.

BRIEF DESCRIPTION OF THE DRAWINGS

Other objects and aspects of the present invention will become apparent from the following description and embodiments with reference to the accompanying drawings in which:

FIG. 10A to 10D show various side views of each of the tooth coils assembled into a concentrated-winding type stator coil unit according to a third embodiment of the present invention;

DETAILED DESCRIPTION OF PREFERRED EMBODIMENTS

Referring to the accompanying drawings, preferred embodiments of the present invention will now be described.

First Embodiment

Referring to FIGS. 1 to 7, a first embodiment of a concentrated winding type stator coil unit according to the present invention, which is incorporated in a rotary electronic machine, will now be described.

Figure 1C:
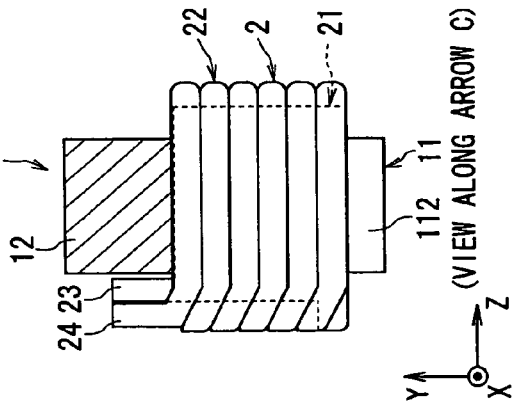
FIG. 1A to 1D show various side views of each of the tooth coils assembled into a concentrated-winding type stator coil unit according to a first embodiment of the present invention.
Figure 1A:
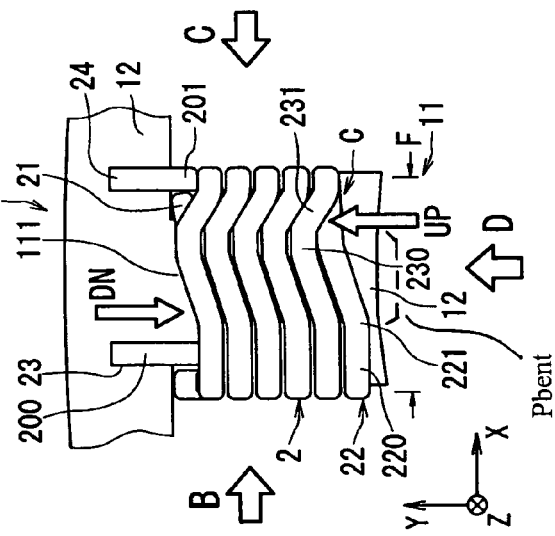
Figure 1B:
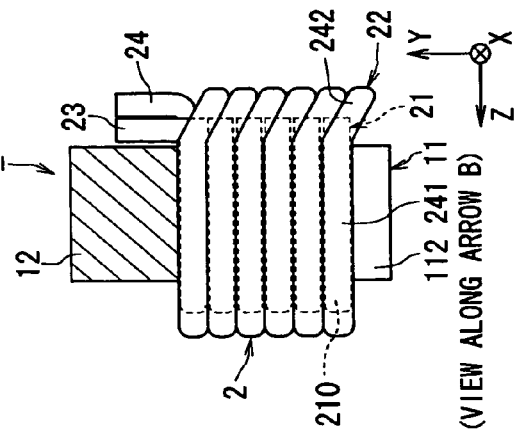
Figure 1D:
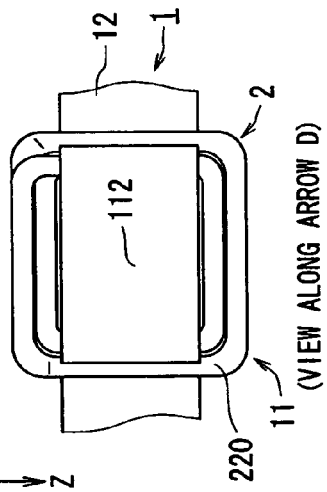

FIGS. 1A to 1D show in part, from various directions, a stator coil unit 100 equipped with a stator core 1 and teeth 11 (only one tooth 11 is illustrated) formed to protrude from the stator core 1. A coil 2 is wound around each tooth 11 to form a tooth-wound coil, which is called "tooth coil." Of these figures, FIG. 1A shows the unit viewed in an axial direction of the stator core 1, FIGS. 1B and 1C are side views of the unit, which are viewed along directions shown by arrows B and C respectively, and FIG. 1D is a bottom view of the unit, which is viewed along a direction shown by an arrow D.

In FIGS. 1A to 1D, the three orthogonal directions are defined such that the axial direction of the stator core 1 (hereinafter referred to as "core-axial direction") corresponds to the Z axis, as shown in FIG. 1A.

Figure 7:
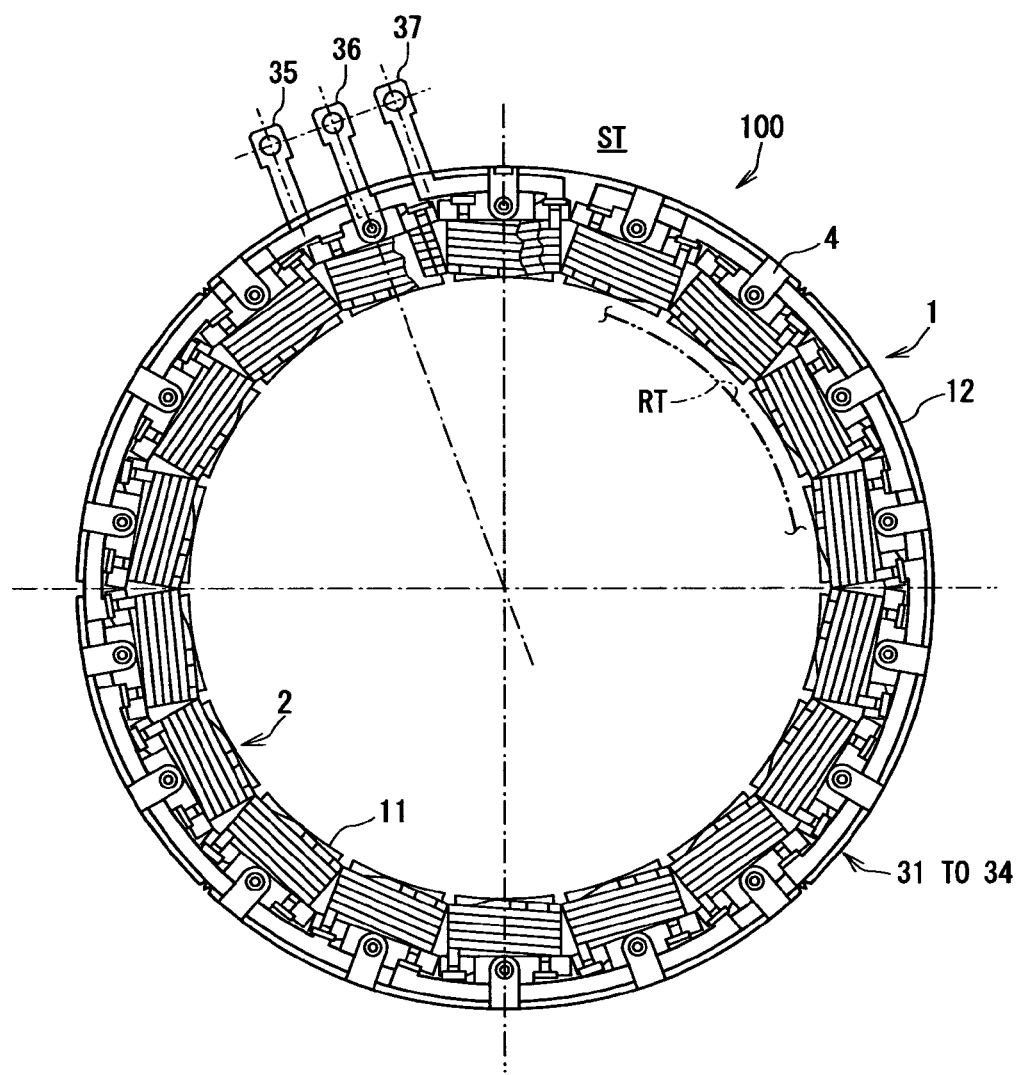
FIG. 7 exemplifies the entire frontal view of a concentrated-winding type stator coil unit to which the unit configurations according to the first embodiment are applied.

The stator coil unit 100 is assembled into a stator ST shown for instance in FIG. 7, where a rotor RT is placed in a bore of the stator ST.

As shown in FIGS. 1A to 1D, the stator core 1 is composed of a core back 12 and teeth 12 protruding from the core back 12 (FIGS. 1A to 1D show only one of the teeth 12). The core back 12, which functions as a yoke, is formed into a cylindrical shape.

The stator core 1 is made up of plural electromagnetic steel plates laminated one on another. As usually known, this stator core 1 is structured in a combined-core form, of which explanation is omitted here, because this combined-core form is not directly concerned with the gist of the present invention.

The teeth 11 are arranged at regular intervals on the inner circumferential surface of the core back 12 and protrudes inward therefrom in radial directions of the stator core 1, respectively. Hereinafter those radial directions are referred to as "core-radial direction(s)."

Each of the teeth 11 is formed to have a square-column-shaped main body 111 and a flange 112 attached to a tip end of the main body 111, which is integrally formed with the main body 111 and opposite to a base end thereof attached to the core back 12. Since this stator core 1 is formed in an outer core type, the tip end and base end of the main body 111 are located inward and outward, respectively, in each of the core radial directions. The flange 112 has both a predetermined thickness in the core-radial direction and a predetermined length in a circumferential direction of the stator core 1 so as to have excessive widths in the circumferential direction. Hereinafter this circumferential direction is referred to as "core-circumferential direction." In addition, the predetermined thickness of each flange 112 in the core-radial direction is set to be larger in a tackiness of a flat type copper wire, which is wound around the main body 111 in turn in the core-radial direction, as will be detailed later.

The tip end of each of the teeth 12, that is, an inner-oriented surface of the flange 112 has a curved surface in the core-circumferential direction to be opposed to a rotor not shown.

The tooth coil 2 is composed of, as stated above, a flat type copper wire coated with a resin-made insulation member and is wound around the main body 111 of each of the teeth 11 in a double-layer manner. Specifically, this tooth coil 2 is composed of, tooth by tooth, a first layered coil 21 formed by winding the wire around the main body 111 of each of the teeth 11, a second layered coil 22 formed by winding the wire around the first layered coil 21, a leading end 23 coupled with a winging-beginning portion of the first layered coil 21, and a leading end 24 coupled with a winding-end portion of the second layered coil 22. In FIG. 1B, a reference 210 shows the last turn of the first layered coil 21.

As stated above, the main body 111 is shaped into a square column shape, so that both of the first and second layered coils 21 and 22 also have coil turns formed into square-shapes, respectively, thus providing each coil turn with four straight segments. Of the four straight segments of each coil turn, a segment located on the same tooth side as both the leading ends 23 and 24 will now be referred to as "frontal coil segment F" (refer to FIG. 1A).

As understood from FIGS. 1A to 1C, both the leading ends 23 and 24 are arranged separately at both endmost positions located along one surface of each of the teeth 11. Additionally, both the leading ends 23 and 24 are drawn from a lump of the turns so that both the ends 23 and 24 are in parallel to each other along an axial direction of each of the teeth 11. One of the leading ends, i.e., the leading end 23 is connected to a wire that reaches the base of each of the teeth 11 along the left side edge shown in FIG. 1A, bent at an approximately right angle to be directed backward in FIG. 1A, and is connected to the winding end of the first layered coil 21.

The first layered coil 21 consists of six turns of the wire formed by sequentially winding the wire around the main body 111, in which the respective turns are aligned at the same level and ranges from the base of each tooth 11 to the tip thereof.

The second layered coil 22 consists of plural turns of the wire formed by sequentially winding the wire around and on the first layered coil 21. To be specific, the turns of the second layered coil 22 includes a first turn 220 formed to continue from a last turn 210 of the first layered coil 21, and the first turn 220 connected to the remaining turns arranged to form the same layer on the first layered coil 21 such that all the turns of the second layered coil range from the tip of each tooth 11 to the base thereof. It is therefore possible to locate both the winding-start end and the winding-finish end at the base of each of the teeth 11.

That is, when winding the wire around each of the teeth 11, the wire starts at the base of the tooth 11 (neighboring to the core back 12), extends to the tip thereof to fold back thereat, and then returns to the base thereof, with the result that the tooth coil 2 has a pair of the first and second layered coils 21 and 22. Although the present embodiment explains the coil configuration in which the number of layered coils is one, this is not a definitive list. Alternatively, two or more pairs of layered coils can be placed.

In the present embodiment, the winding-start and -finish ends of each of the tooth coils 2 can be located to the base side of each of the teeth 11 (specifically, on a part of the core back 12 continuing from the base of each tooth 11). This location of both the ends makes it possible that a crossover wire connecting both of the tooth coils 2 is the shortest in length, whereby an increase in loss due to resistance across the crossover wire is eliminated or suppressed. Concurrently, the connections made between the leading ends 23 and 24 and the crossover wire as well as the crossover wires themselves can be arranged apart sufficiently from the circumferential surface of the rotor. Hence the problem that the crossover wires and/or the connections come in contact with the rotor and the fitting-in operation of the rotor has difficulties can be solved surely. Additionally, even in cases where the crossover wires are assembled to be held by the stator core 1, there is no worry that the tooth coils become obstacles to the holding assembly work. The crossover wires can also be held easily.

The tooth coil 2 has the single pair of leading ends 23 and 24 drawn out toward the core back 12 of the stator core 1 from its winding-start and the winding-finish ends 200 and 201. This arrangement allows the leading ends 23 and 24 to be connected easily to a bus bar between teeth. The bus bar, which is for the crossover wires, can be attached to an available side surface of the core back 12.

Further, in the present embodiment, the winding-start end 200 and the winding-finish end 201 are located with the base of the tooth 11 therebetween in the core-circumferential direction and the leading ends 23 and 24, which include the winding-start and -finish ends 200 and 201 respectively, are drawn outward in the core-radial direction from the base of the tooth 11. This arrangement makes it easier to handle the leading ends 23 and 24, because of the two reasons. One is that the leading ends 23 and 24, which lie on the winding-start side and winding-finish side respectively, can easily be bent along edge portions of the core back 12 serving as slot bottoms on both sides of each of the teeth 11. The other is derived from the fact that the single pair of leading ends 23 and 24 can be separated with a sufficient distance therebetween.

There is another advantage concerning the geometry of the single leading ends 23 and 24. These leading ends 23 and 24 are drawn out from the base of the tooth 11 toward the core back 12 with a sufficient core-circumferential distance left between the leading ends 23 and 24. That is, both the leading ends 23 and 24 are located on the same radially outward side of each tooth coil 2. Hence each of the leading ends 23 and 24 and the tooth-to-tooth crossover wires (including neutral-point crossover wires) can be connected, with ease, on the one core-axial directional side surface of the core back 12.

Figure 2:
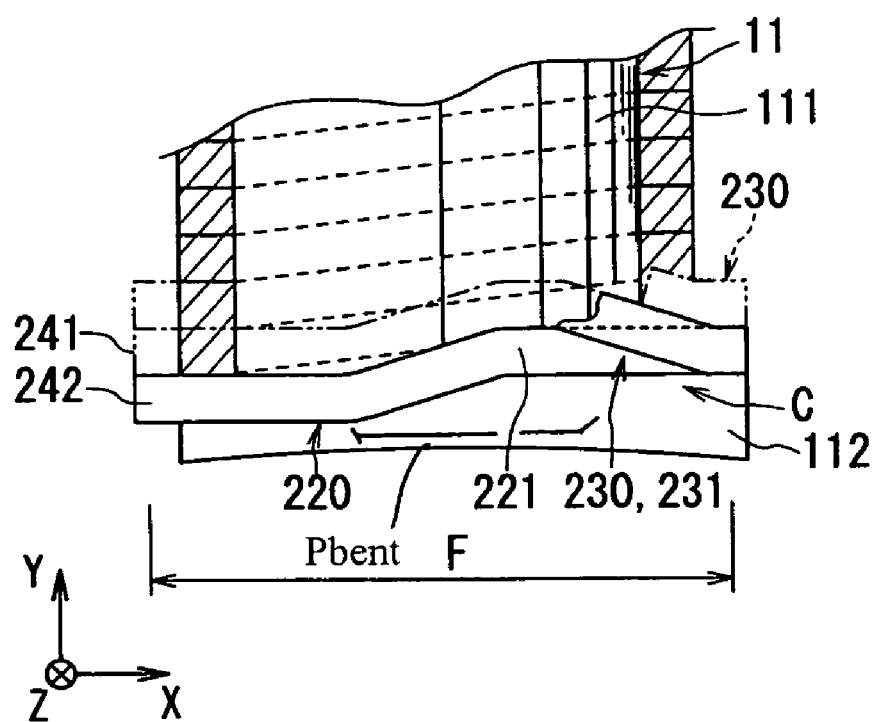
FIG. 2 details a coil folded portion from a first layered coil to a second layered coil.

FIG. 2 details a coil folded portion from the first layered coil 21 to the second layered coil 22. As shown in FIG. 2, the second layered coil 22 includes the first turn 220 stated before and the first layered coil 21 includes the last turn 210 (refer to FIG. 1B). The first turn 220 further includes a beginning portion 221 composed of a partial coil portion, that is, the frontal coil segment F (refer to FIG. 1A).

When the conventional winding way is adopted (that is, when the present invention is not reduced into practice), an end coil portion (which is the last one of the four segments constituting each square-shaped turn and which corresponds to the frontal coil segment F) of the last turn 210 of the first layered coil 21 should serve as, without being changed in the wound positions, the beginning portion 221 of the first turn 220 of the second layered coil 22. Unlike such a coil winding way, the present embodiment to which the present invention is applied adopts a different way of arranging both the end coil portion and the beginning portion.

Practically, in winding the coil wire as the last turn 210 of the first layered coil 21, the coil wire takes a radially-expanded and bent winding path before completing its predetermined helical winding path, the radially-expanded and bent winding path being predetermined for the second layered coil 22. To be specific, the last turn 210 runs along only the three surfaces of each of the teeth 11 (i.e., along only three-fourth of one circuit around the tooth 11) and finishes at a corner C of each tooth 11 to which the frontal coil segment F of the last turn 210 (also serving as the first turn 220) continues (refer to FIGS. 1A and 2).

In addition, the beginning portion 221 of the first turn 220, which is the frontal coil segment F thereof, is made to be bent, as shown in FIGS. 1A and 2, so that the winding path thereof is pushed toward the tip of each of the teeth 11 (that is, inward in the core-radial direction) so as to run along a path lowered (shifted) toward the tip. Hence, this makes it possible that a beginning portion 231 (i.e., the frontal coil segment F thereof) of a second turn 230 continued from the first turn 220 is prevented from being arranged on or over the beginning portion 221 of the first turn 220.

A first end of the beginning portion 231 (i.e., the frontal coil segment F thereof) of the second turn 230 is bent toward the base of the tooth 11, but the beginning portion 231 is still located to be juxtaposed to the beginning portion 221 of the first turn 220 in the core-radial direction. As a result of it, the initial end of the beginning portion 231 is prevented from being arranged on or over the beginning portion 221 of the initial turn 220.

The beginning portion 221 of the first turn 220 which is located along a central part of the frontal coil segment F in FIG. 1A composes a coil-bent portion $P_{bent}$ which corresponds to a coil-bent portion according to the present invention. The same is almost true of the remaining turns of the second layered coil 22.

Since the coil folded portion from the first layered coil 21 to the second layered coil 22, at which the last turn 210 of the first layered coil 21 is bridged to the first turn 220 of the second layered coil 22, the coil conductors (flat type copper wires) wound at the coil folded portion is avoided from being expanded in the core-circumferential direction. Thus, with a slot lamination factor kept high, the second layered coil 2 can be wound around each of the teeth 11 at a high density. Furthermore, the first turn 220 of the second layered coil 22 is wound so that it is shifted, with regard to its winding path, toward the tip of each tooth 11, so that the shift of the second turn 230 toward the base of each tooth 11 can be limited to a less amount in the core-radial direction.

Of the second turn 230 of the second layered coil 22, after having bent, once toward the base of each tooth 11, an approximately middle part of the beginning portion (frontal coil segment) 231 is bent toward the tip of each tooth 11 so that a remaining part of the beginning portion 231, other than the initial end thereof, is located to be along beginning portion 221 of the first turn 220 with almost no gap therebetween. The remaining turns subsequent from the second turn 230 also have the same arrangement as that of the second turn 230 so as to be bent first toward the base of each tooth 11 and then toward the tip thereof, as shown in FIG. 1A.

As shown in FIGS. 1A and 2, when the first turn 220 of the second layered coil 22 is wound, the frontal coil segment F thereof (i.e., the beginning portion 221) is bent at almost right angles around a corner (left-side corner in FIGS. 1A and 2) of each tooth 11 to continue to a side-running second coil segment 241 via an oblique transit coil portion 242 which runs obliquely as shown in FIG. 1B. The oblique transit coil portion 242 serves as a connector to allow the second coil segment 241 to be straight at the same winding level along a left-side surface of each of the teeth 11 (when viewing FIG. 1A). This winding level corresponds to a level at which the second turn 230, except the up and down bent portions thereof, is wound. In this way, through the oblique transit coil portion 242, the coil wire (except the up and down bent portions) of each turn can be wound at the same level around each of the teeth 11. Winding the wire at the same level makes winding work easier.

In FIG. 1A, an upward arrow UP pictorially shows that the initial ends of the front coil segments of the respective turns, other than the first turn 220, of the second layered coil 22 are bent toward the base of each tooth 11. In contrast, a downward arrow DN pictorially shows that the approximately middle parts of all the turns of the second layered coil 22 are bent toward the tip of each tooth 11.

Winding the respective turns in this way prevents the last turn of the second layered coil 22 from interfering (riding) with a bent portion of the leading end 23 (a transition part of the wire from the leading end to the first turn of the first layered coil 21). The wire of the last turn of the second layered coil is bent along a corner of the tooth 11 (i.e., over the bent portion) to continue a beginning portion (i.e., frontal coil segment) of the last turn to the side-running second coil segment thereof. This is helpful in suppressing spatial and electronic interferences between the final turn and the leading end 23. In addition, an insulation performance required for the bent portion can be reduced. The bent portion is allowed to have a certain level of curvature, thus facilitating winding work.

Further, of the respective turns of the second layered coil 22, the beginning coil portion 221 of the first turn 220 is differentiated from that 231 of the second turn 230 in terms of forming the up and down bent portions, as described above. Thus, the beginning oil portion 231 of the second turn 230 can be avoided from riding on that 221 of the first turn 220, thereby suppressing an excessive protrusion of each of the tooth coils 2 in the core-circumferential direction.

Still further, the second layered coil 22 is wound to have the up-and-down bent portions on the one axial side surface of each of the teeth 11, over the side surface of which the leading ends 23 and 24 are formed, as shown FIG. 1A. Accordingly, compared to forming bent portions on a side of each of the teeth 11 in the core-circumferential direction, work to form the up-and-down bent portions according to the present embodiment can be simplified greatly. Furthermore, the problem that the up-and-down bent portions interfere with electric connecting work to the leading ends is also avoidable.

Figure 3:
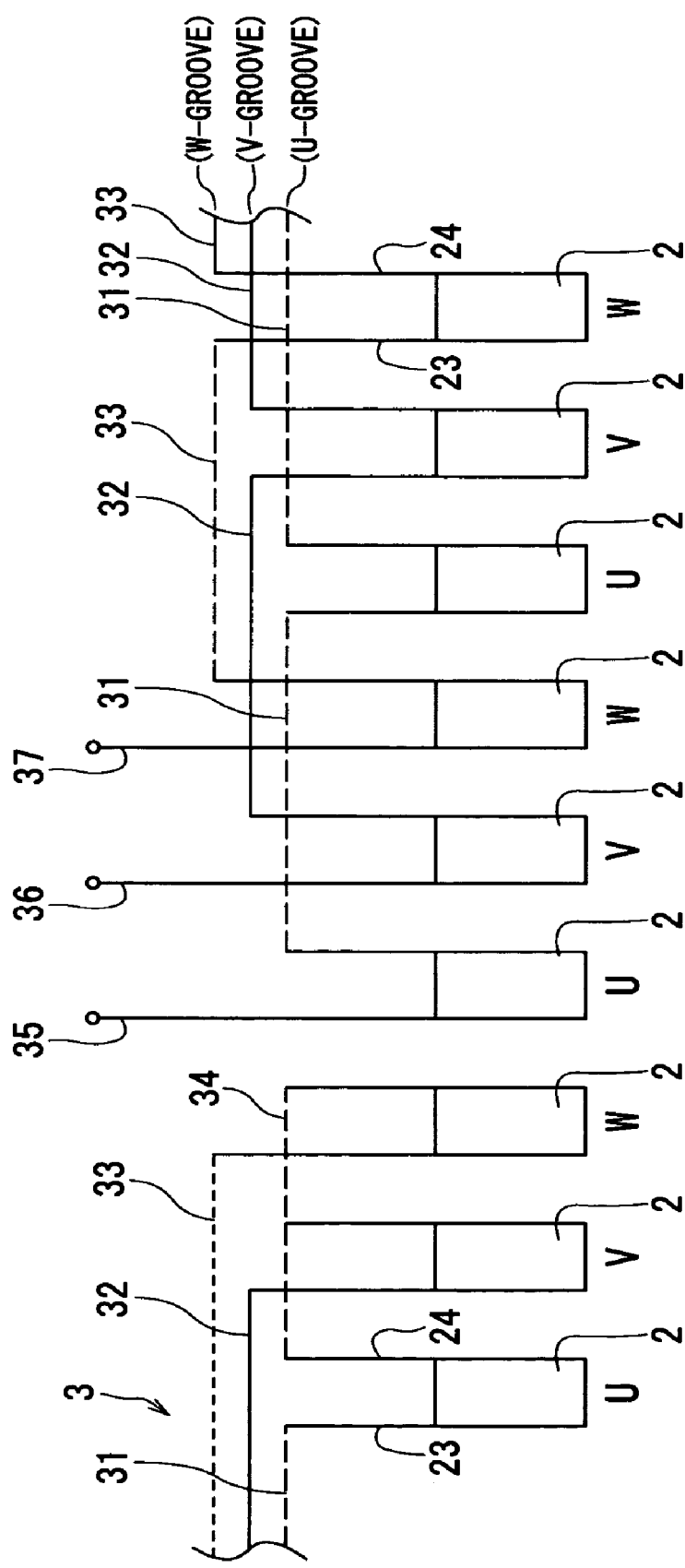
FIG. 3 shows a developed wiring diagram in which a three-phase star type stator coil is configured by serially connecting, phase by phase, the tooth coils.

FIG. 3 shows a developed wiring diagram, in which a three-phase stator coil is configured by serially connecting, phase by phase, the tooth coils 2 explained based on FIGS. 1A to 1D and 2.

The configuration shown in FIG. 3 presents nine tooth coils 2 arranged to be adjacent to each other in the core-circumferential direction, wherein each of the tooth coils 2 has both the leading ends 23 and 24.

For instance, the nine tooth coils 2 are connected to an arch-like bus bar group 3 arranged near to an end surface of the core back 12 of the stator core 1, thereby the leading ends being placed on the end surface. The bus bar group 3 has a U-phase bus bar 31, a V-phase bus bar 32, a W-phase bus bar 33, and a neutral-point bus bur 34.

The bus bar group 3 is connected to external leading terminals 35 to 37, which consist of a U-phase leading terminal 35, a V-phase leading terminal 36, and a V-phase leading terminal 37. In the present embodiment, the external leading terminals 35 to 37 are composed as elongated leading ends 23 of three tooth coils 2. Alternatively, the tooth coils 2 of which leading ends 23 are the same in length can be used, in which the bus bars are connected to such leading ends 23.

Like ordinary distributed-wound three-phase alternating-current rotary electric machines, the directions of magnetic poles of the respective teeth 11 produced with the tooth coils 2 may be set to be U, -W, V, -U, W, -V and then U or simply to be U, V and then W.

In the present embodiment, the U-phase bus bar 31, V-phase bus bar 32, W-phase bus bar 33, and neutral-point bus bur 34 are accommodated separately in three grooves of a bus-bar holder 4 made of resin as molded articles. The bus-bar holder 4 may be formed into a ring shape, but preferably, is formed into a plurality of U-section-shaped holders (refer to FIG. 4A) respectively holding the bus bars at positions independent of the mutual joints between the leading ends 23 and 24 of each tooth coil 2 and the respective bus bars.

Figure 4A:
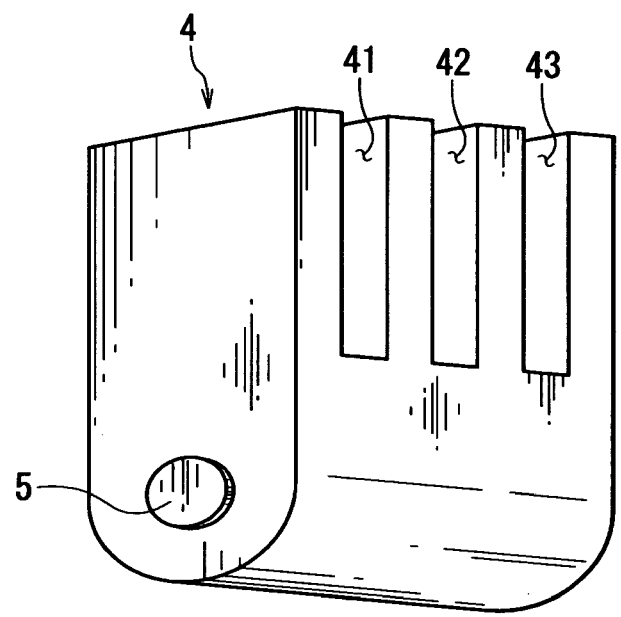
FIG. 4A exemplifies a bus-bar holder employed in the first embodiment.
Figure 4B:
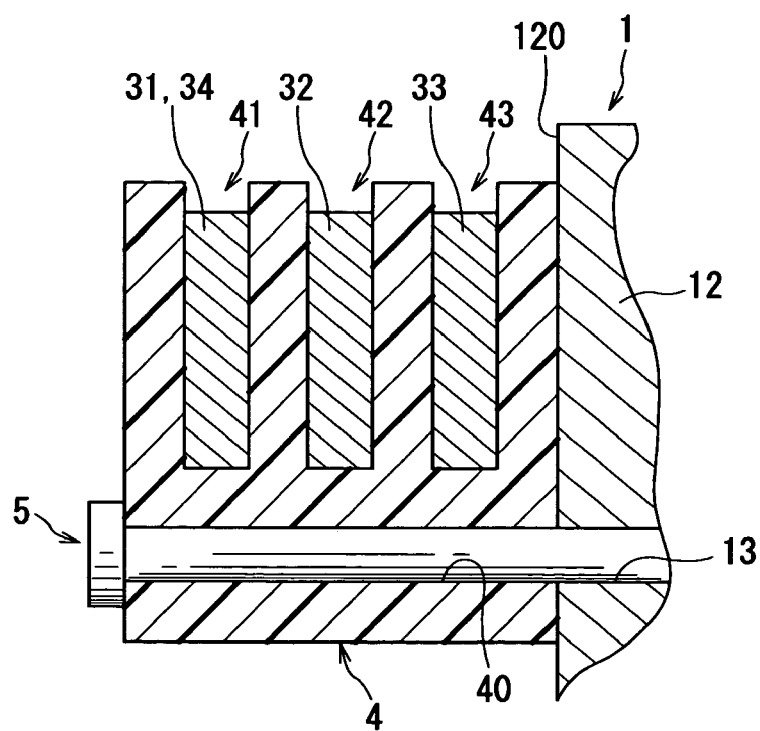
FIG. 4B shows in section the bus-bar holder taken in a direction along an A—A line shown in FIG. 4A.

One example of the bus-bar holder 4 is shown in section in FIGS. 4A and 4B. In FIG. 4B, the bus-bar holder 4 is cut in a direction along an A-A line shown in FIG. 4A.

The bus-bar holder 4 shown in FIG. 4 is shaped to have an approximate U-shape section and is secured on one axial surface of the core back 12 of the stator core 1. The bus-bar holder 4 has a through-hole 4 formed therethrough. A caulking pin 5 is inserted into this hole 4 to pass through a second through-hole 13 formed in the core back 12. The tip of the caulking pin 5 is caulked to attach the bus-bar holder 4 to the core back 12.

As shown in FIGS. 4A and 4B, the bus-bar holder 4 has bus-bar containing grooves 41 to 43 which are cut across one side to the other and opened radially outward. Those grooves 41 to 43 are arranged in parallel in the axial direction of the bus-bar holder 4. Of the bus-bar containing grooves 41 to 43, in the U-phase groove 41, the U-phase bus bar 31 to which the leading ends 23 and 24 of the U-phase tooth coils 2 are connected are contained together with the neutral-point bus bar 34. Containing the neutral-point bus bar 34 will now be described later. Likewise, in the V-phase groove 42, the V-phase bus bar 32 to which the leading ends 23 and 24 of the V-phase tooth coils 2 are connected are contained, while in the W-phase groove 43, the W-phase bus bar 33 to which the leading ends 23 and 24 of the W-phase tooth coils 2 are connected are contained.

Figure 5:
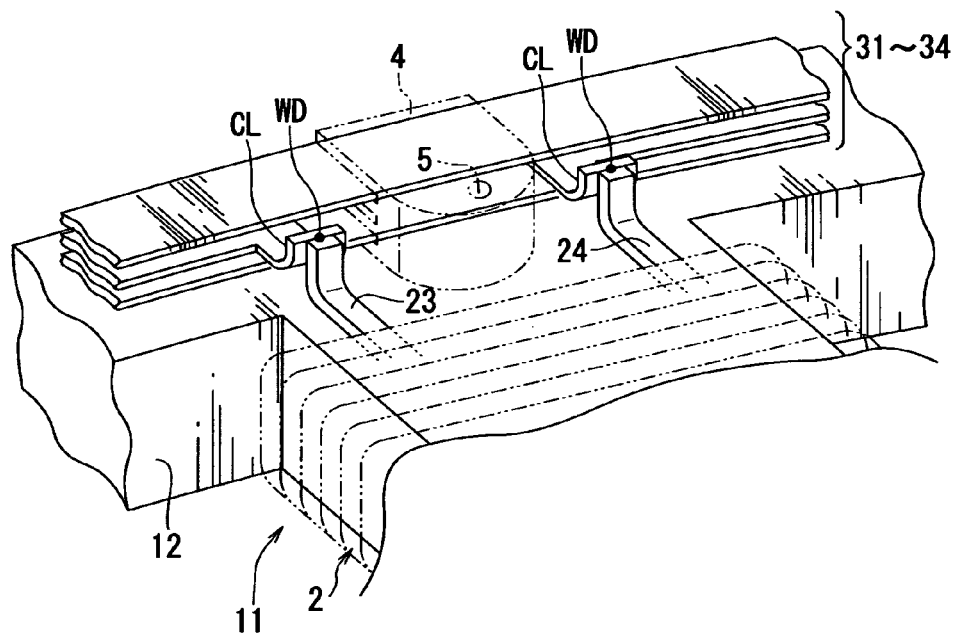
FIG. 5 exemplifies a connecting structure between bus bars and each of the tooth coils.
Figure 6:
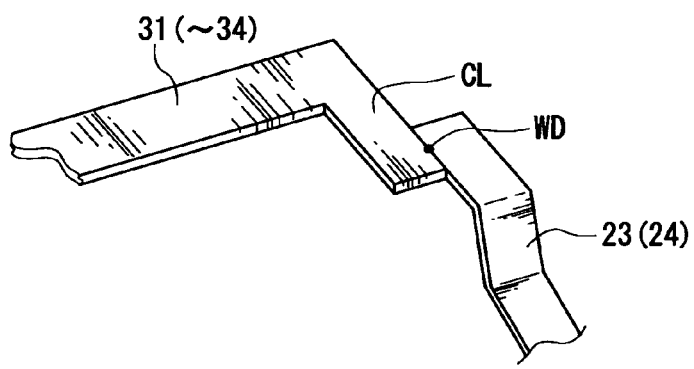
FIG. 6 partially shows a variation of the connecting structure.

Welding or any other connecting ways is performed to connect, at vacant spaces, the leading ends 23 and 24 of each tooth coil 2 to each of the U-phase, V-phase and W-phase bus bars 31, 32 and 33 and the neutral-point bus bar 34. As shown in FIG. 5, each of the bus bars 31 to 34 has a necessary number of connecting claw portions CL extending its radial direction, which are, for example, welded with the leading ends 23 and 24 to establish electric connections therebetween. In FIG. 5, a reference WD shows a point to be welded with each other. Incidentally, the connecting structure between the connecting claw portions CL and the leading ends 23 and 24 may be modified as shown in FIG. 6.

It is preferred that the connecting portions are located not to interfere with each other in a circumferential direction of the bus-bar holder 4. This permits the connecting work to be performed in an easier manner.

As shown in FIG. 3, each of the phase windings is formed by connecting the corresponding tooth coils 2 in series. Thus, for instance, the U-phase bus bar 31 sequentially connects in series all the U-phase tooth coils 2 aligning in the circumferential direction of the stator core 1 through connections with the two leading ends 23 and 24 of each U-phase tooth coil 2.

The windings of the stator are coupled with each other based on a three-phase star connection technique. Thus all the leading ends 24 of the last tooth coils for the respective phase windings are connected with the neutral-point bus bar 34 to form an electrically neutral point of the windings of the stator. As understood from FIG. 3, in the case of the U-phase windings, there is formed a vacancy between the last U-phase bus bar 31 and the first U-phase bus bar 31, the vacancy corresponding in a circumferential distance to the two teeth 11. Accordingly, the neutral-point bus bar 34 can be accommodated in the U-phase bus-bar containing groove 41 of the bus-bar holder 4. The bus-bar containing groove in which the neutral bus bar 34 is contained is not always limited to the U-phase groove.

In this way, the bus bars that serve as the crossover wires, neutral-point wire, phase terminals, and phase-to-phase connection wires can be arranged near to the tooth coils at a higher density with no interference with the tooth coils, thus shortening the leading ends from each of the tooth coils. Furthermore, the bus bars can be attached to the core back with the use of the electric-insulating bus-bar holder, making it easier to secure the bus bars to the stator core. On top of it, the connections between the leading ends of each tooth coil and the bus bars can be facilitated. As a result, as exemplified in FIG. 7, the three-phase star-connection stator coil unit 100 can be provided in a very easier and simpler manner.

Second Embodiment

Figure 8:
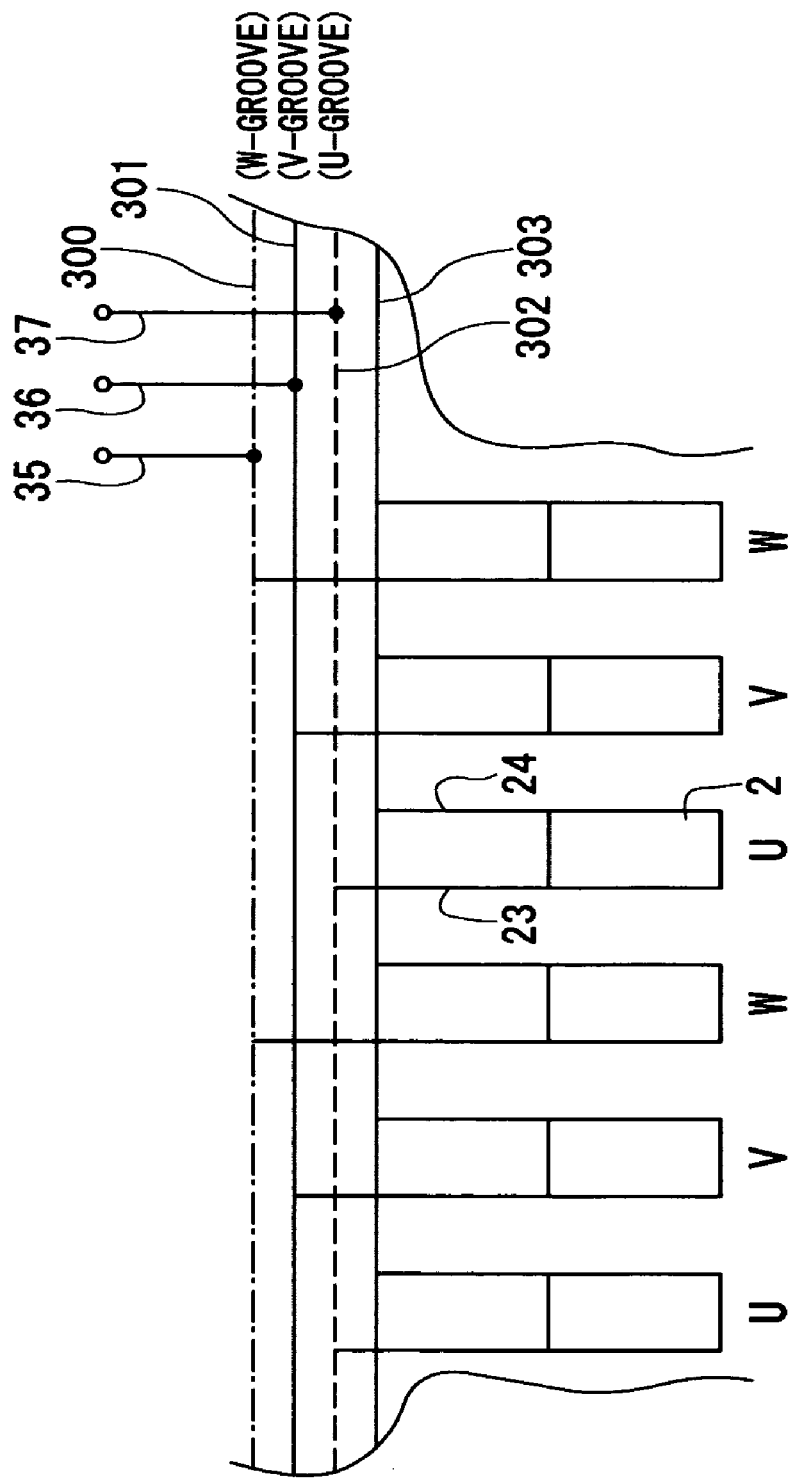
FIG. 8 shows a developed wiring diagram in which a three-phase star type stator coil is configured by connecting, in parallel, the tooth coils, the coil being adopted by a stator coil unit configured according to a second embodiment of the present invention.

Referring to FIG. 8, a concentrated-winding type stator coil unit according to a second embodiment of the present invention will now be described.

In particular, the second embodiment describes the phase windings configured by mutually connecting the tooth coils 2 in parallel.

In the second and subsequent embodiments, the components similar or identical in configurations and/or functions to those described in the foregoing first embodiment are given the same reference numerals to omit them from being explained in detail.

In this embodiment, as shown in FIG. 8, four ring-like bus bars 300 to 304 are used to form a three-phase star-type connection. Those bus bars consist of a W-phase bus bar 300, a V-phase bus bar 301, a U-phase bus bar 302, and a neutral-point bus bar 303. Incidentally, the remaining components of the stator coil unit according to the second embodiment are similar or identical to those of the first embodiment.

Figure 9:
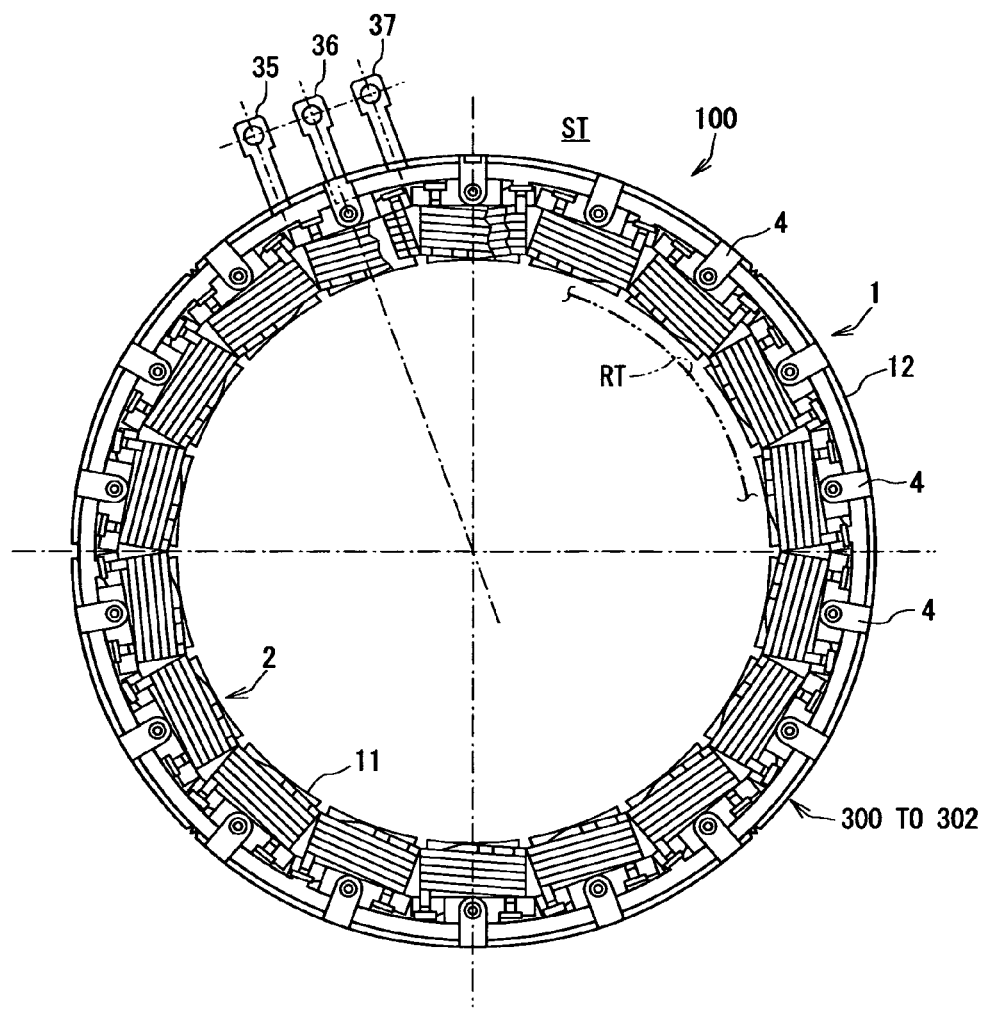
FIG. 9 exemplifies the entire frontal view of the concentrated-winding type stator coil unit to which the unit configurations according to the second embodiment are applied.

Although it is necessary that the stator coil unit according to the present second embodiment be provided with a bus-bar holder having four bus-bar containing grooves, it is enough to add only one bus-bar containing groove to the stator coil unit described in the first embodiment. The other fundamental shapes and configurations are the same as those of the three-phase star-type tooth-coil serial connections described in the first embodiment. Like the first embodiment, such a configuration enables a three-phase star-type connected stator coil shown in FIG. 9 to be assembled in an extremely simple manner.

Third Embodiment

Referring to FIGS. 10A to 10D, a concentrated-winding type stator coil unit according to a third embodiment of the present invention will now be described.

The stator coil unit according to the present embodiment is similar or identical in constructions to the stator coil units described in the first and second embodiment except that the tooth coils 2 are wound in another mode. To be specific, in the present embodiment, the tooth coils 2 are produced to have the second layered coil 22 in which only the down bent portions are formed (refer to an arrow DN in FIG. 10A).

Like the stator core unit shown in FIGS. 1A to 1D, FIGS. 10A to 10D show in part, from various directions, a stator core unit equipped with the stator core 1 and the teeth 11 (only one tooth 11 is illustrated) formed to protrude from the stator core 1. The coil 2 is wound around each tooth 11 to form the tooth-wound coil (tooth coil). Of these figures, FIG. 10A shows the unit viewed in the axial direction of the stator core 1, FIGS. 10B and 10C are side views of the unit, which are viewed along directions shown by the arrows B and C respectively, and FIG. 10D is a bottom view of the unit, which is viewed along the direction indicated by the arrow D.

Each of the teeth coils 2 has the first and second layered coils 21 and 22, as described in the first embodiment, and the second layered coil 22 is formed to have a plurality of rectangular turns composed of four segments when viewed in the core-radial direction. Of the four segments of the respective turns, the frontal coil segments F (residing on one side surface of each tooth 11, on the side surface of which the leading ends 23 and 24 are also arranged) are bent toward the tip of each tooth 11 by a length approximately equal to the thickness of a flat type copper wire to be wound. That is, the frontal coil segments F are wound at their shifted positions, which are nearer to the tip of the tooth 11 by a length corresponding to the thickness (diameter) of the wire.

How to wind the wire will now be described. When winding the coil wire as the last turn 210 of the first layered coil 21, the coil wire takes a radially-expanded and bent winding path before completing its predetermined helical winding path, the radially-expanded and bent winding path being predetermined for the second layered coil 22. To be specific, the last turn 210 runs along only the three surfaces of each of the teeth 11 (i.e., along only three-fourth of one circuit around the tooth 11) and finishes at a corner C of each tooth 11 to which the frontal coil segment F of the last turn 210 (also serving as the first turn 220) continues (refer to FIGS. 10A and 2). This winding structure is essentially the same as that described in the first embodiment.

In addition, as shown in FIG. 10A to 10C, the beginning portion 221 of the first turn 220, which is the frontal coil segment F thereof, is bent at both ends thereof so that the winding path thereof is pushed toward the tip of each of the teeth 11. In the second layered coil 22, the first turn 220 continues to the beginning portion 231 of the second turn 230, which is thus well held by the tip part of the main body 111 of each tooth 11, as shown in FIG. 10D. Like the second turn 230, the remaining turns of the second layered coil 22 are wound in turn, with almost no gap between the turns, on the first layered coil 21, with the frontal coil segments F of the remaining turns wound along lowered tip-side paths.

In the third embodiment, the technique of winding the frontal coil segments F along the paths shifted toward the tip of each tooth 11 can be realized in various ways. After completing the second layered coil 22, all the frontal coil segments F of the second layered coil 22 can be pushed (bent) at a time toward the tip side. An alternative is that each frontal coil segment F can be pushed (bent) every time each turn is wound. Another way is that, provided that each of the previously wound tooth coils 2 can be fit around each of the teeth 11 after completing the winding, the tooth coils 2 can be formed to have the shifted (pushed) frontal coil segments F in their coil paths before the fitting.

Modification

Figure 11:
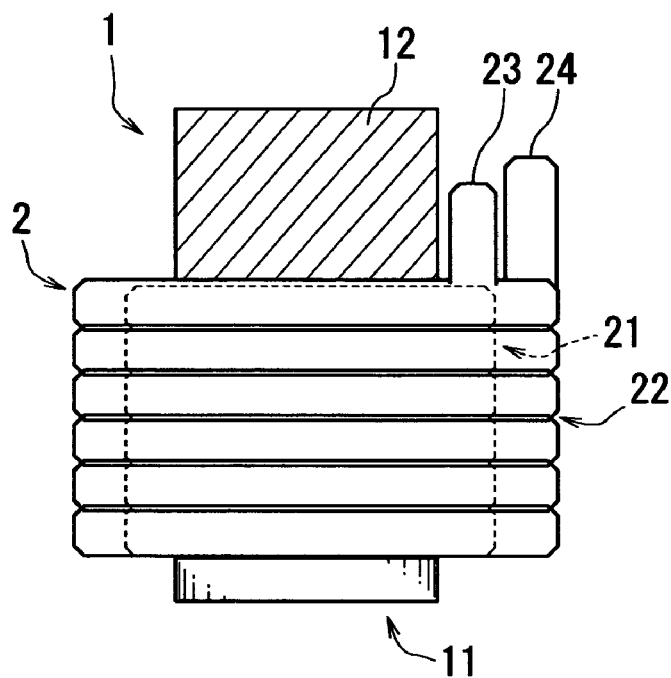
FIG. 11 shows a side view of one of the tooth coils employed by a concentrated-winding type stator coil unit according to a modification of the embodiments.
Figure 12:
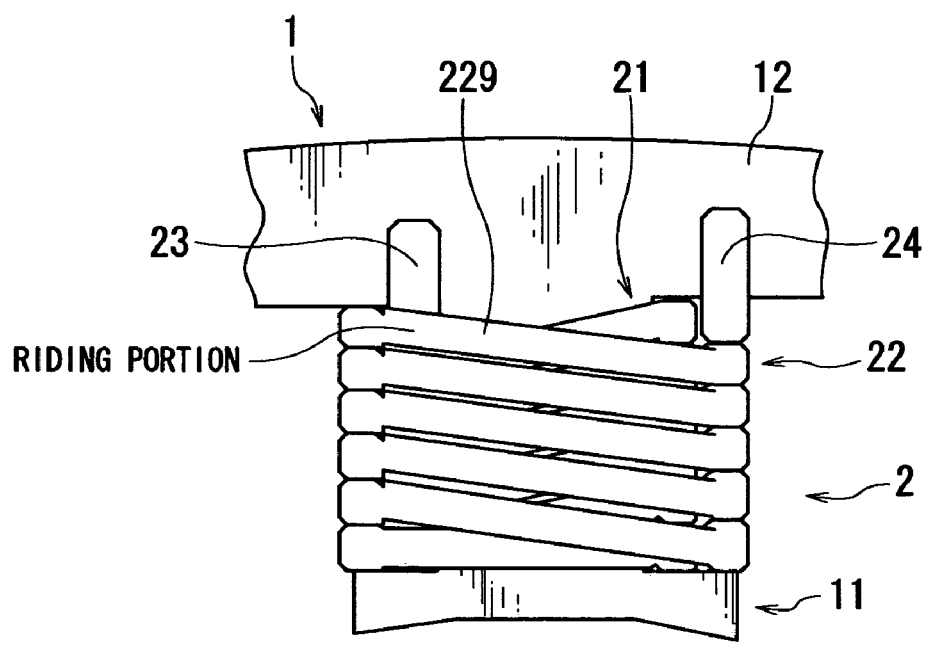
FIG. 12 shows a front view of the tooth coil shown in FIG. 11.

Referring to FIGS. 11 and 12, a concentrated-winding type stator coil unit according to modification of the present invention will now be described.

FIGS. 11 and 12 respectively show a tooth coil 2 employed by the stator coil unit of the present invention. FIG. 11 shows a side view of the tooth coil 2 in the core-circumferential direction, while FIG. 12 shows a front of the tooth coil 2 viewed in the core-axial direction. As understood therefrom, unlike the foregoing embodiments, winding the frontal coil segments F of the turns along the paths shifted toward the tip of each tooth 11 is not adopted, and the coil wire is simply wound to have the leading ends 23 and 24 on the same frontal surface of each of the teeth 11 in the core-axial direction. In this configuration, a last turn 229 of the second layered coil 22 is obliged to have an interference with the leading end 23. That is, the last turn 229 rides on the leading end 23, when the last turn 229 is bent to continue from its frontal coil segment F to a side-running coil segment. Although such an inconvenience may remain, there are still various advantages resulting from the configuration in which both the leading ends 23 and 24 are arranged on the same core-back side surface of each of the teeth 11 in the core-radial direction, like the foregoing embodiments.

It is also possible as another modification that the flat type copper wire used as a coil wire in the foregoing embodiments be changed into other types including a round type copper wire.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2002-17230 filed on Jan. 27, 2003 including the specification, claims, drawings and summary is incorporated herein by reference in its entirety.

What is claimed is:

1. A concentrated-winding type stator coil unit for a rotary electric machine, comprising:

a stator core having a core back and teeth protruding from the core back; and a plurality of coils wound around the teeth respectively, each of the coils being composed of a plurality of layered coils consisting of one or more pairs of layered coils consisting of a first layered coil formed by winding an insulation-coated coil wire in a layer around each of the teeth to form a plurality of turns arranged on each tooth and a second layered coil formed by winding the coil wire in a layer to form a plurality of turns arranged on each of the first layered coils wound around the teeth respectively, wherein the coil wire is wound to allow a last turn of the first layered coil to continue to a first turn of the second layered coil and both ends of the coil wire are located at and on a base portion of each of the teeth so that both ends serve as a winding-start end and a winding-finish end of each of the coils, the first turn of the second layered coil has a coil-bent portion bent toward a tip portion of each of the teeth, a second turn of the second layered coil has another coil-bent portion first bent toward the base portion of each of the teeth and then bent toward the tip portion thereof so that the second turn is juxtaposed to the first turn in a radial direction of the stator core, and one or more other remaining turns of the second layered coil, which continues in turn to the second turn, each has another coil-bent portion first bent toward the base portion of each of the teeth and then bent toward the tip portion thereof so that the remaining turns are juxtaposed in sequence to the second turn in the radial direction of the stator core.

2. The stator coil unit according to claim 1, wherein both the winding-start end and the winding-finish end are drawn out from both the first and second layered coils along the core back as a pair of leading ends of each of the teeth.

3. The stator coil unit according to claim 2, wherein both of the winding-start end and the winding-finish end are placed separately at both circumferential ends of the base portion of each of the teeth in a circumferential direction of the stator core.

4. The stator coil unit according to claim 3, wherein both the leading ends are drawn out directly toward the core back with the separation therebetween kept, whereby both the leading ends are located on the same side of the core back in an axial direction of the stator core.

5. The stator coil unit according to claim 1, wherein the first layered coil is composed of plural turns including the last turn, the plural turns of the first layered coil being wound in turn along a direction heading from the base portion of each of the teeth to the tip portion thereof and the second layered coil is composed of plural turns including the first turn, the plural turns of the second layered coil being wound in turn along a direction heading from the tip portion to the base portion.

6. The stator coil unit according to claim 1, wherein the coil-bent portions of the turns of the second layered coil are arranged over one side of each of the tooth in the axial direction of the stator core, the one side being the same as the side of the core back on which both the leading ends are located.

7. The stator coil unit according to claim 1, comprising bus bars not only serving as at least one of tooth-to-tooth crossover lines, a neutral-point line, and phase terminals but also being disposed in proximity to an axial surface of the core back, the axial surface being the same as the side of the core back on which both the leading ends are located.

8. The stator coil unit according to claim 7, wherein the bus bars consist of different phase bus bars located differently in the axial direction of the stator core, the crossover lines for the same phase being located in the same position in the axial direction of the stator core, and
   wherein both the leading ends of each of the coils are joined with the bus bars.

9. The stator coil unit according to claim 8, comprising a bus-bar holder being attached to the axial surface of the core back and having a plurality of grooves being oriented, after the attachment, along the circumferential direction of the stator core and being opened outward in the radial direction of the stator core,
   wherein the bus bars are accommodated phase by phase in the grooves.

10. The stator coil unit according to claim 9, wherein a specified one of the grooves houses a neutral-point bus bar connected to three-phase windings realized as a whole by the coils wound around each of the teeth.

11. A concentrated-winding type stator coil unit for a rotary electric machine, comprising:
   a stator core having a core back and teeth protruding from the core back; and
   a plurality of coils wound around the teeth respectively, each of the coils being composed of a plurality of layered coils consisting of one or more pairs of layered coils consisting of a first layered coil formed by winding an insulation-coated coil wire in a layer around each of the teeth to form a plurality of turns arranged on each tooth and a second layered coil formed by winding the coil wire in a layer to form a plurality of turns arranged on each of the first layered coils wound around the teeth respectively,
   wherein the coil wire is wound to allow a last turn of the first layered coil to continue to a first turn of the second layered coil and both ends of the coil wire are located at and on a base portion of each of the teeth so that both ends serve as a winding-start end and a winding-finish end of each of the coils and
   wherein the first turn of the second layered coil has a coil-bent portion bent toward a tip portion of each of the teeth.

12. The stator coil unit according to claim 11, wherein the coil-bent portion of the first turn of the second layered coil is arranged over one side of each of the tooth in the axial direction of the stator core, the one side being the same as the side of the core back on which both the leading ends are located.

13. The stator coil unit according to claim 11, comprising bus bars not only serving as at least one of tooth-to-tooth crossover lines, a neutral-point line, and phase terminals but also being disposed in proximity to an axial surface of the core back, the axial surface being the same as the side of the core back on which both the leading ends are located.

14. The stator coil unit according to claim 13, wherein the bus bars consist of different phase bus bars located differently in the axial direction of the stator core, the crossover lines for the same phase being located in the same position in the axial direction of the stator core, and
   wherein both the leading ends of each of the coils are joined with the bus bars.

15. The stator coil unit according to claim 14, comprising a bus-bar holder being attached to the axial surface of the core back and having a plurality of grooves being oriented, after the attachment, along the circumferential direction of the stator core and being opened outward in the radial direction of the stator core,
   wherein the bus bars are accommodated phase by phase in the grooves.

16. The stator coil unit according to claim 15, wherein a specified one of the grooves houses a neutral-point bus bar connected to three-phase windings realized as a whole by the coils wound around each of the teeth.

17. A method of winding a coil wire around each of teeth protruding from a core back of a stator core incorporated in a concentrated-winding type stator coil unit for a rotary electric machine, the method comprising the steps of:
   locating a one end of the coil wire along a single side surface of a base portion of each of the tooth with a first predetermined end portion of the one end drawn out toward the core back as a first leading end, the single side surface facing an axial direction of the stator core;
   first winding the core wire on and around each of the teeth to form a plurality of turns extending as a first layered coil from the base of each tooth to a tip portion thereof, a last turn being wound to reach a position on each tooth at which the side surface begins;
   second winding the coil wire on and around the first layered coil wound on and around each tooth to form a plurality of turns extending as the second layered coil from the tip portion of each tooth to the base portion, the first turn of the second layered coil being continued from the last turn of the first layered coil,
   wherein a transit coil portion is formed and wound so as to serve as both of part of the last turn of the first layered coil and part of the first turn of a second layered coil wound around the first layered coil, the transit coil portion being bent to run a different path at least partially shifted toward the tip of each tooth so as to form a coil-bent portion bent toward a tip portion of each of the teeth,
      a second turn of the second layered coil has another coil-bent portion first bent toward the base portion of each of the teeth and then bent toward the tip portion thereof so that the second turn is juxtaposed to the first turn in a radial direction of the stator core, and
      one or more other remaining turns of the second layered coil, which continues in turn to the second turn, each has another coil-bent portion first bent toward the base portion of each of the teeth and then bent toward the tip portion thereof so that the remaining turns are juxtaposed in sequence to the second turn in the radial direction of the stator core; and
   locating a remaining end of the coil wire along the single side surface of the base portion of each of the tooth with a second predetermined end portion of the remaining end drawn out toward the core back as a second leading end.

18. The method of winding the coil wire according to claim 17, wherein both of the leading ends are drawn out directly toward the core back with a separation therebetween kept, whereby the both the leading ends are located on the same side surface of the core back in the axial direction of the stator core.

* * * * *